(12) United States Patent
Li et al.

(10) Patent No.: US 10,891,111 B2
(45) Date of Patent: *Jan. 12, 2021

(54) DISTRIBUTED KEY-VALUE CONSISTENCY AND MAPPING

(71) Applicant: International Business Machines Corporation, Armonk, NY (US)

(72) Inventors: Shuo Li, Beijing (CN); Xin Peng Liu, Beijing (CN); Meng M. Wan, Beijing (CN); Chen Xin Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,604

(22) Filed: Feb. 19, 2019

(65) Prior Publication Data
US 2019/0179619 A1 Jun. 13, 2019

Related U.S. Application Data

(63) Continuation of application No. 15/630,029, filed on Jun. 22, 2017, now Pat. No. 10,275,223.

(51) Int. Cl.
*G06F 9/45* (2006.01)
*G06F 8/20* (2018.01)
(Continued)

(52) U.S. Cl.
CPC .............. *G06F 8/24* (2013.01); *G06F 16/258* (2019.01); *G06Q 10/10* (2013.01)

(58) Field of Classification Search
CPC .......... G06F 8/24; G06F 16/258; G06Q 10/10
(Continued)

(56) References Cited

U.S. PATENT DOCUMENTS 5,261,002 A * 11/1993 Perlman ................ H04L 9/3263
380/30
5,761,306 A * 6/1998 Lewis ................ G06Q 20/3829
380/282
(Continued)

FOREIGN PATENT DOCUMENTS

CN 103678285 A 3/2014

OTHER PUBLICATIONS

Mao et al, "Cache Craftiness for Fast Multicore Key-Value Storage", ACM, pp. 183-196 (Year: 2012).*
(Continued)

*Primary Examiner* — Anil Khatri
(74) *Attorney, Agent, or Firm* — Richard A. Wilhelm

(57) ABSTRACT

A processor within a networked distributed drafting platform generates a public key-value context file that includes initial default key-value mappings between keywords and values for use in a distributed drafting project. Refined project-level key-value mappings are elected by considering differences between the initial default key-value mappings and personal key-value mappings within a set of distributed personal key-value context files each maintained by different drafters of the distributed drafting project. The initial default key-value mappings of the public key-value context file are updated with the elected refined project-level key-value mappings within the networked distributed drafting platform.

16 Claims, 4 Drawing Sheets

(51) Int. Cl.
*G06F 16/25* (2019.01)
*G06Q 10/10* (2012.01)

(58) Field of Classification Search
USPC .................................................. 717/133–141
See application file for complete search history.

(56) References Cited

U.S. PATENT DOCUMENTS

| | | | |
|---|---|---|---|
| 5,956,728 A * | 9/1999 | Federighi | G06F 8/24 |
| 6,341,291 B1 | 1/2002 | Bentley et al. | |
| 6,571,235 B1 | 5/2003 | Marpe et al. | |
| 6,654,932 B1 | 11/2003 | Bahrs et al. | |
| 6,728,950 B2 * | 4/2004 | Davis | G06F 8/44 |
| | | | 703/23 |
| 7,010,683 B2 * | 3/2006 | Corella | H04L 9/002 |
| | | | 713/156 |
| 7,194,489 B2 | 3/2007 | Bentley et al. | |
| 7,437,739 B1 * | 10/2008 | Hsieh | G06Q 10/06 |
| | | | 719/328 |
| 7,721,270 B2 | 5/2010 | Ukelson et al. | |
| 8,612,402 B1 * | 12/2013 | Givargis | G06F 16/217 |
| | | | 707/693 |
| 8,615,731 B2 | 12/2013 | Doshi | |
| 8,645,928 B2 * | 2/2014 | Chu | G06F 9/454 |
| | | | 717/136 |
| 8,818,993 B2 | 8/2014 | Boyd et al. | |
| 8,826,222 B2 * | 9/2014 | Bak | G06Q 10/06 |
| | | | 717/101 |
| 8,850,409 B2 * | 9/2014 | Cheriton | G06F 8/437 |
| | | | 717/136 |
| 8,990,335 B2 * | 3/2015 | Fauser | G06F 16/183 |
| | | | 709/215 |
| 9,015,248 B2 | 4/2015 | Barreto et al. | |
| 9,037,556 B2 * | 5/2015 | Castellano | G06F 16/2358 |
| | | | 707/703 |
| 9,141,378 B2 | 9/2015 | Fox et al. | |
| 9,189,480 B2 * | 11/2015 | Thiruvidan | G06F 16/93 |
| 9,348,802 B2 | 5/2016 | Massand | |
| 9,372,858 B1 | 6/2016 | Vagell et al. | |
| 9,665,623 B1 * | 5/2017 | Peng | G06F 16/1858 |
| 9,798,772 B2 * | 10/2017 | Wu | G06F 16/532 |
| 10,042,869 B1 * | 8/2018 | Piszczek | H04L 12/6418 |
| 2014/0143000 A1 | 5/2014 | Kay | |
| 2018/0373501 A1 | 12/2018 | Li et al. | |

OTHER PUBLICATIONS

Faster: A Concurrent Key-Value Store with In-Place Updates, ACM, pp. 275-290 (Year: 2018).*

Samuel et al, "Survivable Key Compromise in Software Update Systems", ACM, pp. 61-72 (Year: 2010).*

Hu et al, "An Improved Mutual Authentication and Key Update Scheme for Multi-Hop Relay in Internet of Things", IEEE, pp. 1024-1029 (Year: 2011).*

Lai et al, "SPIR: A Secure and Privacy-Preserving Incentive Scheme for Reliable Real-Time Map Updates", IEEE, pp. 416-428 (Year: 2020).*

Zhao et al, "A new key update scheme for Internet of Things", IEEE, pp. 1241-1244 (Year: 2011).*

Lai et al, "A Trust-based Real-time Map Updating Scheme", IEEE, pp. 334-339 (Year: 2019).*

Chatterjee et al, "Public Key Infrastructure for Named Data Networks", ACM, pp. 1-10 (Year: 2020).*

Qin et al, "Leakage-Resilient Lossy Trapdoor Functions and Public-Key Encryption", ACM, pp. 3-11 (Year: 2013).*

United States Patent and Trademark Office, Office Action for U.S. Appl. No. 15/630,029, dated Aug. 3, 2018, pp. 1-21, Alexandria, VA, USA.

United States Patent and Trademark Office, Notice of Allowance for U.S. Appl. No. 15/630,029, dated Dec. 17, 2018, pp. 1-16, Alexandria, VA, USA.

IBM, List of IBM Patents or Patent Applications Treated as Related, Applicant Appendix, Feb. 19, 2019, pp. 1-2, the contents of which are incorporated herein by reference in their entirety.

Dmitry Basin, et al., KiWi: A Key-Value Map for Scalable Real-Time Analytics, In Proceedings of the 22nd ACM SIGPLAN Symposium on Principles and Practice of Parallel Programming, Feb. 4, 2017, pp. 357-369, Association of Computing Machinery, Austin, TX, USA.

Goncalo Tomas, et al., FMKe: a Real-World Benchmark for Key-Value Data Stores, In Proceedings of the 3rd International Workshop on Principles and Practice of Consistency for Distributed Data, Apr. 23, 2017, pp. 1-4, Association of Computing Machinery, Belgrade, Serbia.

Even-Andre Karlsson, et al., Daily build and feature development in large distributed projects, In Proceedings of the 22nd International Conference on Software Engineering, Jun. 4, 2000, pp. 649-658, Association of Computing Machinery, Limerick, Ireland.

Esko Kurvinen, et al., User-Centered Design in the Context of Large and Distributed Projects, In Proceedings of the CHI '06 Extended Abstracts on Human Factors in Computing Systems, Apr. 22, 2006, pp. 995-1000, Association of Computing Machinery, Montreal, Quebec, Canada.

Matthias Heindl, et al., Risk Management with Enhanced Tracing of Requirements Rationale in Highly Distributed Projects, In Proceedings of the 2006 International Workshop on Global Software Development for the Practitioner, May 23, 2006, pp. 20-26, Association of Computing Machinery, Shanghai, P. R. China.

Youngki Hong, et al., Prediction of Defect Distribution based on Project Characteristics for Proactive Project Management, In Proceedings of the 6th International Conference on Predictive Models in Software Engineering, Sep. 12, 2010, pp. 1-7, Association of Computing Machinery, Timisoara, Romania.

* cited by examiner

US 10,891,111 B2

DISTRIBUTED KEY-VALUE CONSISTENCY AND MAPPING

BACKGROUND

The present invention relates to terminology usage consistency in distributed document collaborations. More particularly, the present invention relates to distributed key-value consistency.

Different groups of document drafters and/or document translators may be physically distributed across different geographic regions. These different groups of document drafters and/or document translators may each be responsible for working on different sections of a given collaborative document.

SUMMARY

A computer-implemented method includes generating, by a processor within a networked distributed drafting platform, a public key-value context file that comprises initial default key-value mappings between keywords and values for use in a distributed drafting project; electing refined project-level key-value mappings by considering differences between the initial default key-value mappings and personal key-value mappings within a plurality of distributed personal key-value context files each maintained by different drafters of the distributed drafting project; and updating, within the networked distributed drafting platform, the initial default key-value mappings of the public key-value context file with the elected refined project-level key-value mappings.

A system that performs the computer-implemented method and a computer program product that causes a computer to perform the computer-implemented method are also described.

DETAILED DESCRIPTION

Figure 1:
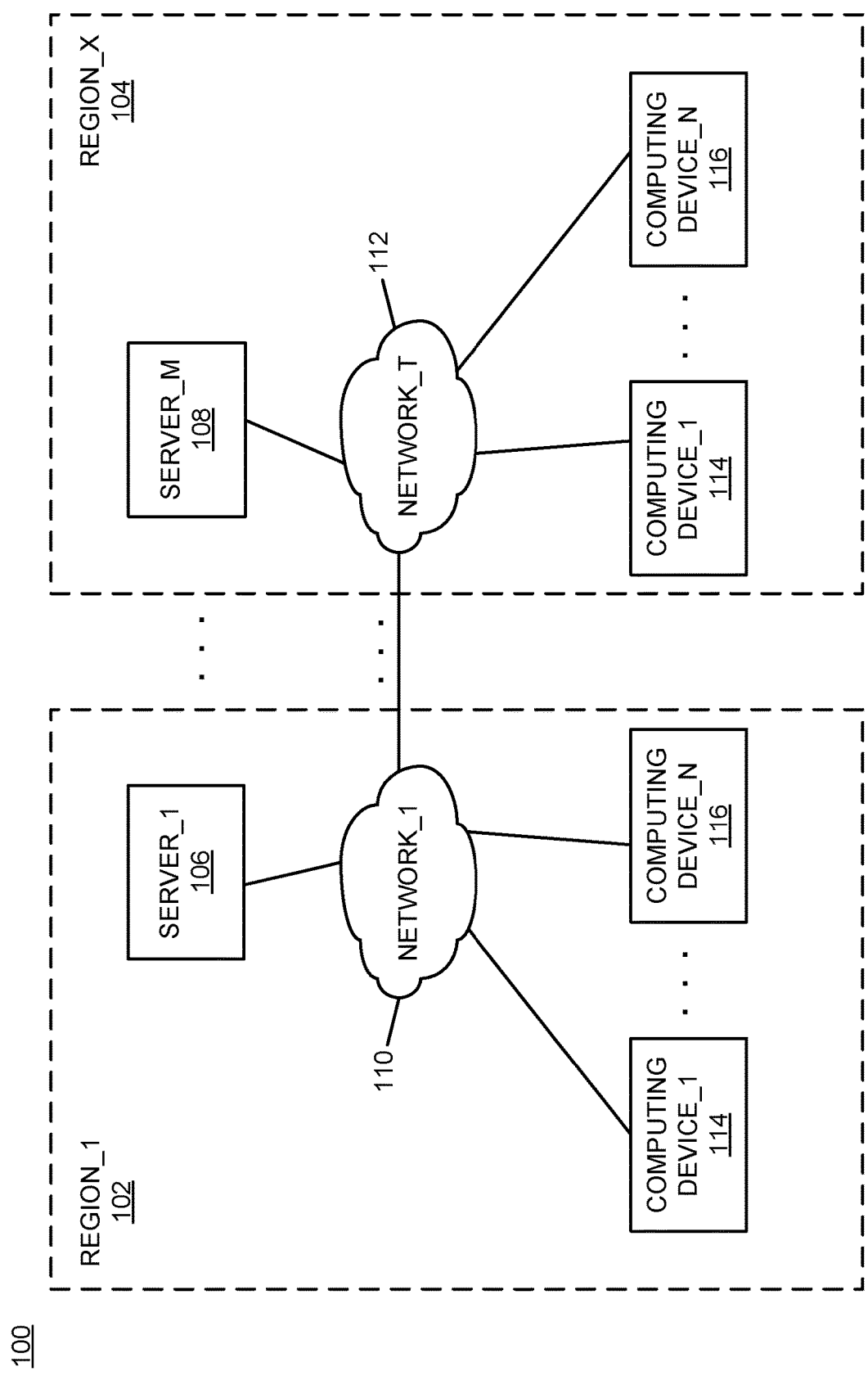
FIG. 1 is a block diagram of an example of an implementation of a distributed system for distributed key-value consistency according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides distributed key-value consistency. The present technology solves recognized language usage inconsistency and translation inconsistency problems that previously existed in distributed collaborative document drafting and distributed document translation environments among different groups of document drafters and/or document translators. It was observed that different document drafters and document translators that collaborate on a document may adopt and utilize different terminology, different acronyms, and different meanings for terminology during the course of a document drafting or document translation project. It was further observed that where these different document drafters and document translators were responsible for different sections of the same document, the adoption of the different terminology, acronyms, and meanings by different document drafters and document translators resulted in language usage inconsistencies within the same document.

For ease of description herein, the terms "project" and "distributed project" refer to a work product of a document drafting activity, a document translation activity, or other document-related activity where multiple drafters are involved in changing and/or augmenting content of the respective work product. The term "keys" refers to terms or phrases within the text of a project. The terms "drafters" or "document drafters" refer to document drafters, document translators, and other system users that are responsible for changes to a project.

The technology described herein provides a new distributed computing platform that includes a new form of distributed computational processing that identifies and resolves language usage inconsistencies among different drafters. The technology provides a new distribution of functionality within a distributed network-based computing platform. The technology further operates to integrate differences in terminology and acronym usage among different distributed collaborative drafters/groups to increase consistency of document development and document translation within complex distributed computing environments. The technology described herein provides a systematic and programmatic set of techniques by which a master/public project-level set of terms ("keys" or "keywords") and corresponding mapped values ("values" or "key values") may be maintained within a distributed system, and each drafter may maintain a personal drafter-level set of terms and value mappings. Negotiated values for keywords may be hierarchically calculated in a distributed manner that allows repeated/continuous refresh in circumstances where group members assigned to a drafting project may change continuously. The negotiated values for the keywords may be harvested from individual members of each sub-community/group, and further negotiated across sub-communities/groups until an entire distributed drafting community utilizes consistent terminology. Terminology and acronym usage within a distributed drafting project that is outside of the negotiated set of key values may be programmatically replaced across a distributed set of computing systems in a fully automated and programmatic manner. By use of the technology described herein, distributed drafting projects may be made more efficient by reduction of distributed computational processing by computing devices of individual drafters that would otherwise be required to resolve differences in terminology usage. Network bandwidth usage may also be reduced by distributed centralized remote processing of different context files, and other platform computational improvements may result by use of the technology described herein.

As such, individual drafters may work independently without concerns for compliance with complex terminology usage and consistency; while the distributed drafting project is programmatically and continuously refined to use terminology, acronyms, and other negotiated values in a consistent manner throughout the distributed drafting project. Further, individual drafters may change (e.g., leave and be replaced by new drafters) throughout the project, and the distributed drafting project may remain consistent in terminology usage without individualized terminology training or management of individual drafters. As such, the technology described herein provides user level customization of drafting settings, while remaining administrable as drafters are added to and removed from a project.

The technology described herein operates by generating, by a processor within a networked distributed drafting platform, a public key-value context file that comprises initial default key-value mappings between keywords and values for use in a distributed drafting project; electing refined project-level key-value mappings by considering differences between the initial default key-value mappings and personal key-value mappings within a plurality of distributed personal key-value context files each maintained by different drafters of the distributed drafting project; and updating, within the networked distributed drafting platform, the initial default key-value mappings of the public key-value context file with the elected refined project-level key-value mappings.

As described in more detail below, keys (terms) may be programmatically extracted from project files by a user-level or server computing device, and a public keys list may be generated along with a default value mapping for the public keys. A public key-value context file may be generated using the default key-value mappings/list. The public key-value context file provides the starting point for identification of and integration of differences of key-value mappings across different drafters that are geographically distributed.

The computing device(s) of each drafter that is working on the same drafting project may also generate a personal key-value context file that stores the drafter's personal key-value mappings. The mappings in the default key-value mapping list of the public key-value context file may be considered by each drafter in association with generation of their personal key-value context file. Each of the personal key-value context files may be coordinated across the distributed computing platform to elect a project-wide public key-value mapping for each key, and the public key-value context file may be updated with the respective elected project-wide public key-value mappings. Similar personal key-value context files may be merged to form an aggregated new value that is common to the project-wide public key-value mapping, and the public key-value context file may be automatically updated upon identification of any change in a personal key-value mapping.

The processing to aggregate and unify the public key-value context file and the respective distributed personal key-value context files may be iteratively performed to continuously improve language usage consistency across a particular project. Further, the iterative processing may be hierarchically performed within a complex distributed drafting platform to further compartmentalize and improve the efficiency of the programmatic aggregation of the different distributed key-value context files.

Based upon the technology described herein, key-value mappings and other terminology artifacts across different nodes in a distributed system gradually become consistent among any of the project parts that may be changed. The technology described herein allows drafters to have different values for the same key, and through aggregation the technology programmatically arrives at a consistent negotiated value. The negotiated value keeps changing during the negotiation period. Those drafters that have similar (but not exactly the same) changed key values for a key may be selected, a negotiated value calculated, and those drafters' changed key values merged into a larger unit bearing the negotiated value for the next hierarchical level of similarity checking, negotiation, and merging, until finally through iteration and expansion of scope the technology programmatically arrives at one consistent value for a key across the entire project.

The collaborative key-value mapping for distributed projects described herein ensures that each key-value pair may be maintained consistently across an entire distributed project. The public key-value mapping context file may be maintained at a project-level of the distributed project. Each part of the project may be automatically/programmatically coordinated with the personal key-value context files associated with different drafters that are assigned to the project. As such, programmatic distributed project/document control is facilitated in real time, and may be performed in a continuous and distributed manner. The programmatic distributed project/document control may be implemented in a single computing node that is located near or remotely from the drafters, as appropriate for the given implementation.

Because each drafter has an associated personal key-value context file, the drafters may consider and use new key-value pairs that have not yet been extracted into the public key-value context file. These new key-value pairs may be added into the personal key-value context file, and thereafter used during the distributed programmatic augmentation of the public key-value context file.

Further regarding the distributed programmatic augmentation of the public key-value context file, if it is programmatically determined that there are identical values for the same key in multiple personal key-value context files, an algorithmic weight of one (1) may be assigned to the key value within the processing algorithm. Otherwise, different algorithmic weights of less than one (<1) may be assigned where different key values are identified across different personal key-value context files. As such, each distributed processing computing platform (e.g., sub-group) may be considered equal for election of key values, and may affect the resulting project-level key values, but may not directly change the project-level key values.

The target (elected) public key value for each key may be returned to any drafter with a different personal key value that is not the same as the target public key value. The drafter may make a final decision regarding use of any target public key value during any particular phase of a project instead of using their original personal key value. If the drafter does not replace their personal key value for a given key with the target public key value, the personal key value may be marked in the personal key-value context file, and the section of the project under control of the drafter may be programmatically updated at a later time to allow the drafter to continue drafting efforts in a manner that is efficient for the drafter (e.g., without use of terminology that may be unfamiliar to the drafter, but appropriate for use in the drafting project). If the drafter replaces their original personal key value with the target public key value, the updated key value may also be marked in the personal key-value context file.

This processing may be iteratively and hierarchically performed until processing of all personal key-value context files is completed. The duration of each iterative processing interval may be configured as appropriate for a given implementation.

To provide a detailed example of implementation and use of the technology described herein, it may be assumed that there are ten (10) drafters assigned to a project for translating the same book from the English language to the Chinese language. Each drafter is considered to be responsible for and translates a different portion of the book. The book is considered to have a subject of computing science, and named <Big Data Sample Book>. The digital files for the original book content may be placed in a network storage location (e.g., a cloud storage location, etc.) so that all drafters may access their respective portions for translation.

Processing may begin by programmatically extracting public keys from the entire book. For example, keys "Big Data," "Connected Data," and "Data Cleaning" may be extracted and placed into a public key-value context file. The default translation key values for the public key-value context file may be derived from any suitable source (e.g., a technical dictionary, etc.).

Each drafter out of the ten drafters may translate keys into different words/values. Each drafter may maintain a personal key-value context file for their translated key-value pairs.

For the English language key "data cleaning" in the extracted public key-value context file, it is assumed that the first drafter translates this key into Chinese to "数据清洗," and that a second drafter translates this key to "数据清理." As such, the key-value mapping of "data cleaning: 数据清洗" may be stored in the first drafter's personal key-value context file, and the key-value mapping of "data cleaning: 数据清理" may be stored in the second drafter's personal key-value context file.

A programmatic key-value mapping module may process all of the personal key-value mapping files to make sure all of the keys are consistent across the different parts of the project. Any differences between the default initial key values and key values of the individual drafters may be considered and updated/adjusted values may be elected based upon any identified differences. The adjusted/elected values for keys may be appended to the respective key-value context files.

The drafters may determine whether to apply the adjusted/elected values for all keys, to partially apply any adjusted values, or to not apply any adjusted values. For example, if the drafter is new to the Chinese language, it may be difficult for the drafter to perform their assigned translation activities using a translated value if they are unfamiliar with a subtle distinction between their personal key value and the adjusted/elected key value. In such a circumstance, allowing the drafter to continue their translation uninterrupted and unburdened by the subtle linguistic differences, while documenting the different usage in the personal key-value context file of the drafter, may allow the programmatic processing to adjust the key values later (e.g., after the drafter has completed their portion of the project).

To further detail the context file aggregation, each processing node may have its own personal key-value context file. Each of the node-level personal key-value context files may be merged into a group to augment the default values of the initial (or subsequent) public key-value context file. When a node/group is further aggregated to another higher-level group, any key values in the local personal key-value context file that have been updated to reflect the elected key values of the public key-value context file may be updated to only store an index pointer to the respective key of the public key-value context file to more easily update the respective key values. Each node may maintain a private reflecting list, and a public list. The public list may be backed up on each private node.

When any given group of drafters is very large, it may be burdensome to aggregate the different key-value context file to make the entire project consistent as a single unit. In such a situation, the project may be divided into document section sub-groups or geographical region sub-groups, and the processing performed initially on the sub-groups to make those sub-groups consistent, followed by iteratively moving up the hierarchy to the project level to make the entire project consistent. For example, the distributed processing described herein may be performed by defining multiple sets of sub-groups of the different drafters of the drafting project, and processing key-value mapping differences of sub-sets of distributed personal key-value context files utilized by the different drafters of the drafting project that are within each sub-group into sub-group level key-value mappings for the respective sub-group. The results of the sub-group level key-value mappings of the multiple different sub-groups may then be aggregated into refined project-level key-value mappings of the public key-value context file.

The programmatic key-value mapping module may complete its coordination of the various context files across the project at any suitable time. All key values may be consolidated across the project to ensure collaboration consistency at intervals appropriate for the given implementation.

It should be noted that multiple collaboration consistency projects may be managed concurrently by the technology described herein. Each project may have a different set of the public and personal key-value context files that are independently processed for consistency in association with the respective project. The election of key values for keys may be scoped to a level of a specific project to allow for different terminology usage in different projects. As such, the elected key-value mapping may be different for different projects. These differences may depend upon the "context" (linguistic distinctions) of the particular project and the drafters assigned to the particular project. To switch between working on the different projects, the drafter may specify/select a new project, and the computing platform may remove (e.g., unplug) the context files from the previous project, and may add (plug in) the context files for the new project. As such, context changes among projects may be performed instantaneously and in a programmatic manner.

It should be noted that conception of the present subject matter resulted from recognition of certain limitations associated with distributed collaborative document creation and translations. For example, it was observed that collaborative drafting projects, such as translating a lengthy text from one language to one or more other languages, may be partitioned to different drafting groups that may be geographically distributed and located within different geographic regions where different terms may have different meanings. It was additionally determined that group members of the same or different groups may each have a different primary language relative to either the source or target languages of the particular translation. It was recognized that conventional technologies utilized for translation did not account for or manage language-usage differences across different regions and different primary languages utilized by different groups of people. Further, because of the different meanings for terms being recognized by different persons in different regions, consistency of terminology within translations was not possible using these conventional technologies. It was observed that this inconsistency of terminology usage is compounded where different groups in different geographic regions are assigned different sections of a lengthy text to draft or translate and that a document reader is often left to encounter completely different meanings for terms within the same document. Additionally, it was recognized that the problem of inconsistency in translations is further compounded because new sub-communities or drafting members join or leave drafting groups continually during lengthy drafting projects. From these several observations, it was determined that a distributed computing platform that programmatically evaluates different terminology usages across different geographic regions and that resolves ambiguities in usage of terminology would improve distributed collaborative document creation and translations. The present subject matter improves distributed collaborative document creation and translations by providing for distributed key-value consistency, as described above and in more detail below. As such, improved translation and document creation consistency may be obtained through use of the present technology.

The distributed key-value consistency described herein may be performed in real time to allow prompt resolution of terminology inconsistencies in drafting and translations among different distributed groups of drafters. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additionally, the present technology may be implemented within or as part of a cloud computing environment (e.g., for data analytics), or may be implemented as a customized environment-specific solution. Examples of implementation as a customized environment-specific solution are included herein.

FIG. 1 is a block diagram of an example of an implementation of a distributed system 100 for distributed key-value consistency. A region_1 102 through a region_X 104 represent multiple geographically distributed processing regions of the distributed system 100. The depicted geographically distributed processing regions may be located within different cities, different countries, or otherwise distributed as appropriate for a given implementation.

Within each of the multiple geographically distributed processing regions represented by the region_1 102 through the region_X 104 one or more of a server_1 106 through a server_M 108 may provide distributed processing capabilities to carry out the distributed key-value consistency described herein. Each of the multiple geographically distributed processing regions further includes one or more networks represented by the network_1 110 through the network_T 112. Each of the multiple geographically distributed processing regions also includes one or more computing devices usable by document drafters, as represented for ease of description within each region as a computing device_1 114 through a computing device_N 116.

As will be described in more detail below in association with FIG. 2 through FIG. 4, any of the server_1 106 through the server_M 108, and any of the computing device_1 114 through the computing device_N 116, may each provide and/or collaborate to provide the automated distributed key-value consistency described herein. The automated distributed key-value consistency is based upon programmatic analysis of key-value pairs utilized by different document drafters across the different geographic regions to unify the use of terminology by the different drafters. The present technology may be implemented at a user computing device or server device level, or by a combination of such devices as appropriate for a given implementation. A variety of possibilities exist for implementation of the present subject matter, and all such possibilities are considered within the scope of the present subject matter.

The network_1 110 through the network_T 112 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 106 through the server_M 108 may include any device capable of providing data for consumption by a device, such as the respective computing device_1 114 through the computing device_N 116, via a network, such as one or more of the network_1 110 through the network_T 112. As such, the server_1 106 through the server_M 108 may each include a web server, application server, database server, or other data server device.

Figure 2:
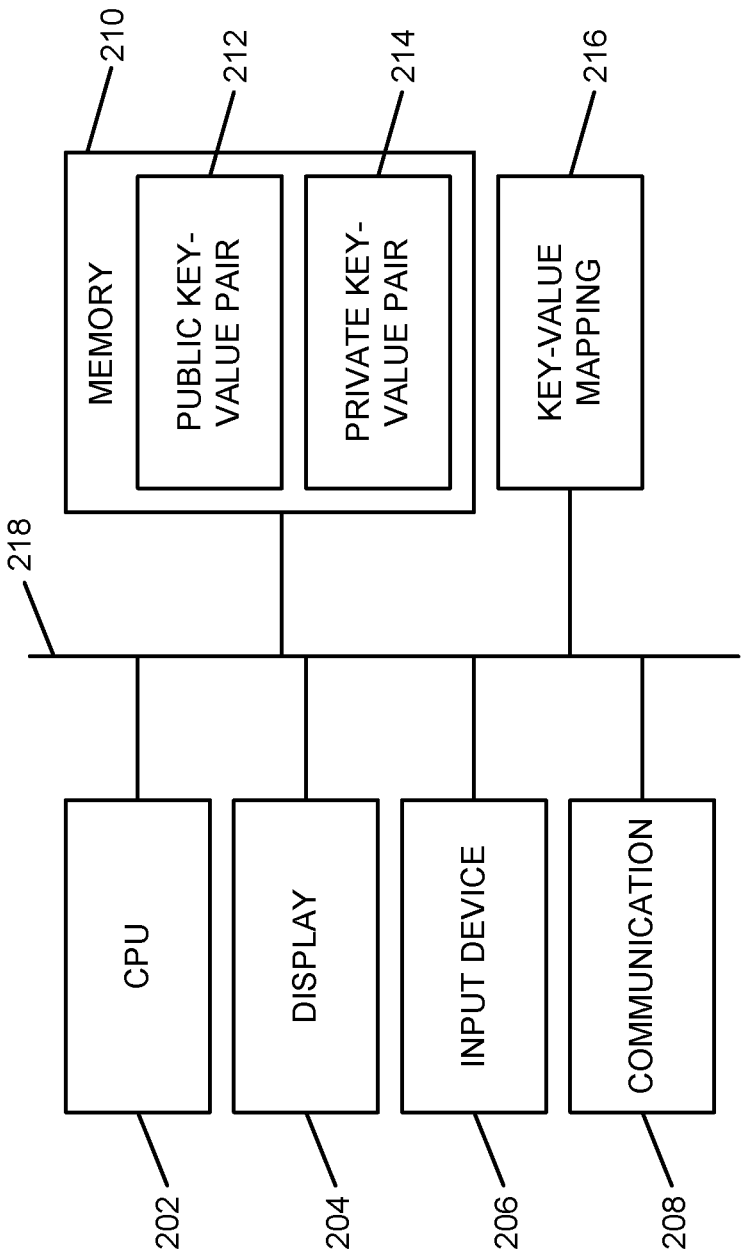
FIG. 2 is a block diagram of an example of an implementation of a core processing module capable of performing distributed key-value consistency according to an embodiment of the present subject matter.

FIG. 2 is a block diagram of an example of an implementation of a core processing module 200 capable of performing distributed key-value consistency. The core processing module 200 may be associated with any of the computing device_1 114 through the computing device_N 116 and with any of the server_1 106 through the server_M 108, with modifications as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein where appropriate for a given implementation.

Further, the core processing module 200 may provide different and complementary processing of public and private key-value pairs used by distributed drafters in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a public key-value pair storage area 212 that provides storage space for one or more public key-value context files of one or more drafting projects, and associated aggregation information within the core processing module 200. The memory 210 also includes a private key-value pair storage area 214 that provides storage space for one or more private key-value context files of one or more drafting projects, and associated information within the core processing module 200.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A key-value mapping module 216 is also illustrated. The key-value mapping module 216 provides computational processing capabilities to manipulate large sets of key-value pairs, and to merge and aggregate disparate key-value mappings of different drafters into a unified public key-value mapping for one or more document projects within the core processing module 200, as described above and in more detail below. The key-value mapping module 216 implements the automated distributed key-value consistency of the core processing module 200.

It should also be noted that the key-value mapping module 216 may form a portion of other circuitry described without departure from the scope of the present subject matter. The key-value mapping module 216 may form a portion of an interrupt service routine (ISR), a portion of an operating system, or a portion of an application without departure from the scope of the present subject matter. The key-value mapping module 216 may also include an embedded device with circuitry designed specifically to perform the processing described herein as appropriate for a given implementation.

The CPU 202, the display 204, the input device 206, the communication module 208, the memory 210, and the key-value mapping module 216 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor (s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. Accordingly, the core processing module 200 may take many forms and may be associated with many platforms.

Figure 3:
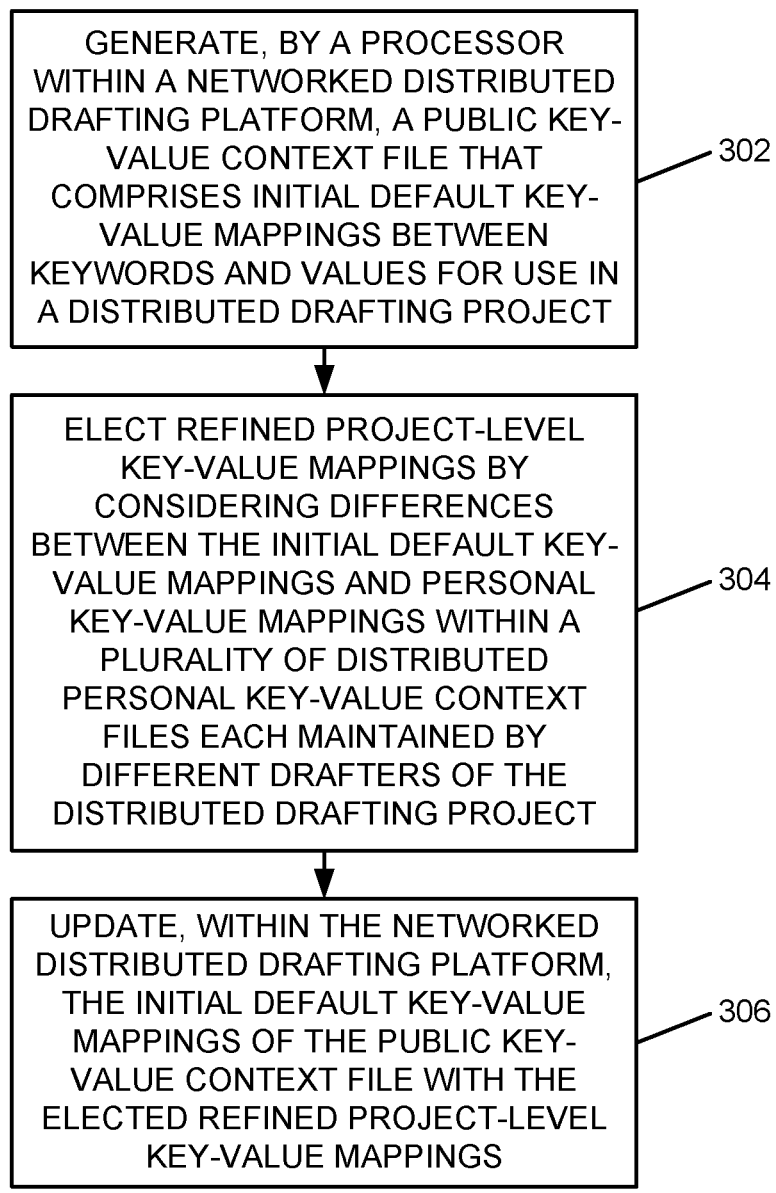
FIG. 3 is a flow chart of an example of an implementation of a process for distributed key-value consistency according to an embodiment of the present subject matter.
Figure 4:
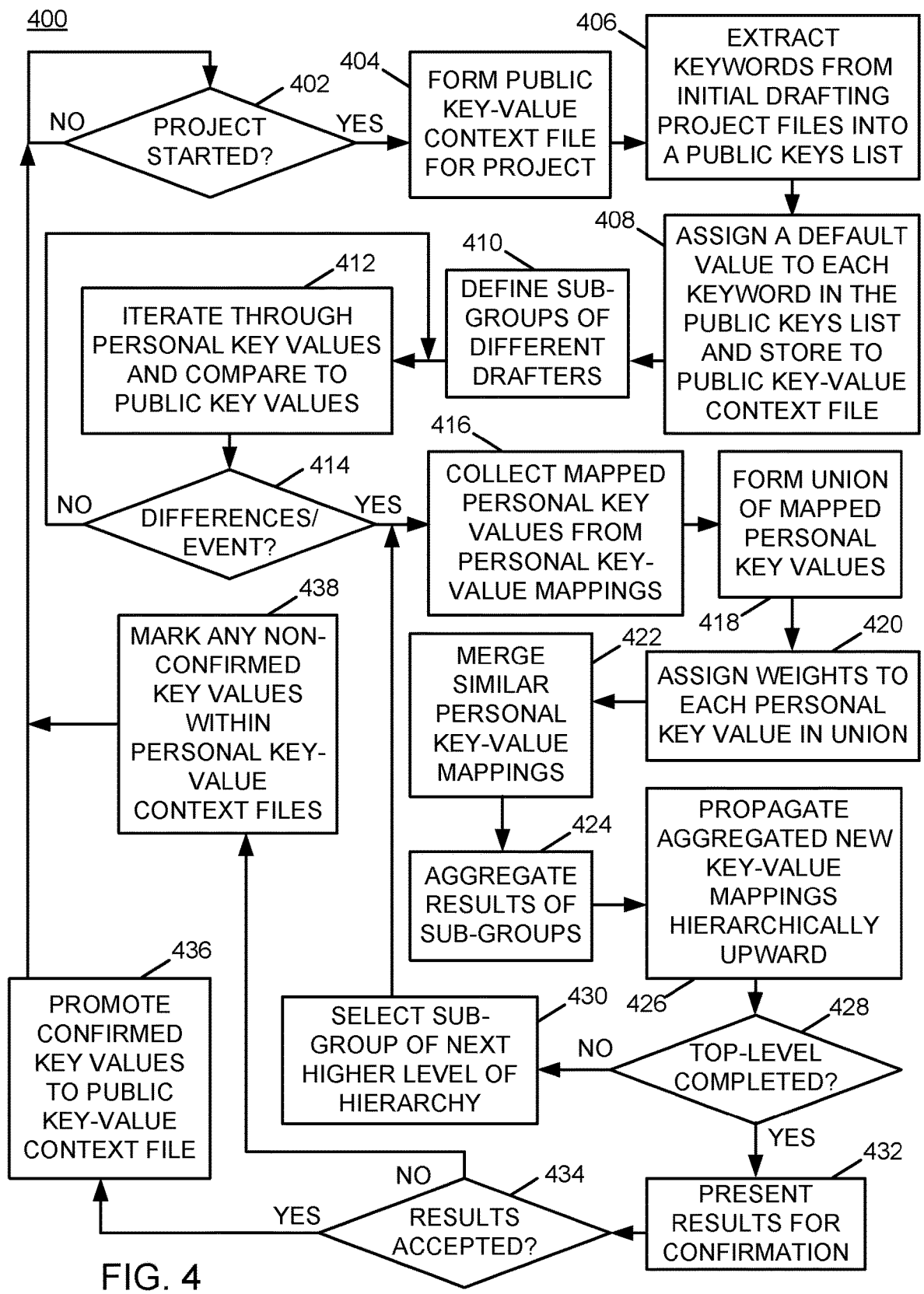
FIG. 4 is a flow chart of an example of an implementation of a process for distributed key-value consistency that iteratively processes hierarchically distributed sub-groups according to an embodiment of the present subject matter.

FIG. 3 through FIG. 4 described below represent example processes that may be executed by devices, such as the core processing module 200, to perform the automated distributed key-value consistency associated with the present subject matter. Many other variations on the example processes are possible and all are considered within the scope of the present subject matter. The example processes may be performed by modules, such as the key-value mapping module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for distributed key-value consistency. The process 300 represents a computer-implemented method of performing the subject matter described herein. At block 302, the process 300 generates, by a processor within a networked distributed drafting platform, a public key-value context file that comprises initial default key-value mappings between keywords and values for use in a distributed drafting project. At block 304, the process 300 elects refined project-level key-value mappings by considering differences between the initial default key-value mappings and personal key-value mappings within a plurality of distributed personal key-value context files each maintained by different drafters of the distributed drafting project. At block 306, the process 300 updates, within the networked distributed drafting platform, the initial default key-value mappings of the public key-value context file with the elected refined project-level key-value mappings.

FIG. 4 is a flow chart of an example of an implementation of a process 400 for distributed key-value consistency that iteratively processes hierarchically distributed sub-groups. The process 400 represents a computer-implemented method of performing the subject matter described herein. At decision point 402, the process 400 makes a determination as to whether a collaborative document drafting or translation project has been started within a distributed drafting environment, such as the distributed computing environment 100 described above. In response to determining that a collaborative document drafting or translation project has been started, the process 400 forms a public key-value context file for the project at block 404.

At block 406, the process 400 extracts keywords from initial drafting project files into the public keys list. The initial drafting project files may include a document to be translated for a translation project, or may include notes files or dictionaries as appropriate for translation or document drafting files. The extracted keywords of the public keys list may be used across the distributed drafting project and updated throughout the drafting project as described above and in more detail below. At block 408, the process 400 assigns a default value to each of the extracted keywords within the public key-value context file (public keys list), and stores the public keys list along with the default value mappings to a public key-value context file.

At block 410, the process 400 defines multiple sub-groups of different drafters of the drafting project. The defined sub-groups may be defined according to geographic regions of the different drafters of the drafting project, portions of the distributed drafting project worked on by the different drafters of the drafting project, or otherwise as appropriate for a given implementation.

For purposes of the description herein, it is presumed that a document drafting or translation project takes considerable time, and that the processing described below of the process 400 may be configured at certain time intervals or may be performed continuously or otherwise as appropriate for a given implementation and/or project. At block 412, the process 400 begins processing to iterate through personal key values of different drafters in the different sub-groups and to compare the personal key values to the public key values (initially the assigned default values) in the public key-value context file. The process 400 may process key-value mapping differences of sub-sets of the plurality of the distributed personal key-value context files utilized by the different drafters of the drafting project that are within each sub-group into sub-group level key-value mappings for the respective sub-group. The process 400 may begin at a lower/lowest level of a hierarchy of distributed sub-groups (e.g., by geographic city), and may move up hierarchically over time (e.g., move up to geographic state, country, etc.) as drafting efforts progress.

At decision point 414, the process 400 makes a determination as to whether any differences between public and personal keyword values have been identified, or whether a scheduled event has been configured that causes further iteration back to block 412 to continue iteration and comparison of public and personal key values as described above. In response to determining that no differences have been identified, and that a scheduled event has been configured and has occurred to cause further iteration back to block 412, the process 400 returns to block 412 and iterates as described above until at least one difference has been identified.

In response to identifying a change in a personal keyword value, such as in response to identifying a change in the personal key-value mapping of one of the distributed personal key-value context files of the distributed document drafters, the process begins automated processing to update the public-key value context file. At block 416, the process 400 collects mapped personal keyword/key values from personal key-value mappings of the different drafters in the sub-group. For example, the process 400 may collect, from each of the distributed personal key-value context files, a mapped personal key value for a keyword represented within at least one personal key-value mapping. At block 418, the process 400 forms a union of mapped personal key values that represents each mapped personal key value collected from the distributed personal key-value context files. At block 420, the process 400 assigns a weight to each mapped personal key value in the union according to a quantity of occurrences of the mapped personal key value across the distributed personal key-value context files. At block 422, the process 400 merges similar personal key-value mappings of the keywords in the distributed personal key-value context files into aggregated new mapped values for the keywords. For example, the process 400 may select, from the union of mapped personal key values, a highest-weighted mapped personal key value as a refined project-level key-value mapping for the particular keyword.

At block 424, the process 400 aggregates results of the sub-group level key-value mappings of the sub-groups into the refined project-level key-value mappings. At block 426, the process 400 propagates the aggregated new key-value mappings hierarchically upward from the distributed personal key-value context files within the distributed drafting project into the refined project-level key-value mappings.

At decision point 428, the process 400 makes a determination as to whether the top/highest level of the distributed hierarchy has been completed. In response to determining that the top/highest level of the distributed hierarchy has not been completed, the process 400 selects a sub-group of a next-higher level of the hierarchy at block 430. The process 400 returns to block 416 and iterates as described above, to process key-value mapping differences of sub-sets of the plurality of distributed personal key-value context files utilized by the different drafters of the drafting project that are within the next sub-group into sub-group level key-value mappings for the respective sub-group.

Returning to the description of decision point 428, in response to determining that the top/highest level of the distributed hierarchy has been completed, the process 400 presents the automated processing results to a project drafter for confirmation at block 432. The project drafter may be an entity responsible for final decisions regarding terminology selection for a particular drafting project, for a particular sub-group, or otherwise as appropriate for a given implementation.

At decision point 434, the process 400 makes a determination as to whether the results of the automated processing have been accepted. In response to determining that the results of the automated processing have been accepted, the process 400 promotes confirmed key values to the public keys list in the public key-value context file at block 436. Alternatively, in response to determining that any one or more of the results of the automated processing have not been accepted, the process 400 marks any non-confirmed keyword/key values within the personal key-value context files at block 438. As such, drafters may maintain marked differences relative to the public key values, and may merge any marked values at a later time during a later execution of the process 400. It should be noted that the processing at blocks 436 and 438 may be considered concurrent, in that some key values may be accepted/promoted while other key values may be marked for later promotion, as appropriate for a given implementation. In response to either promoting the confirmed key values to the public keys list in the public key-value context file at block 436, or marking any non-confirmed keyword/key values within the personal key-value context files at block 438, the process 400 returns to decision point 402 and iterates as described above. It should be noted that the process 400 may be made re-entrant at block 412 for ongoing/lengthy drafting projects without departure from the scope of the subject matter described herein.

As such, the process 400 forms a public key-value context file for the project with default keyword/value mappings, and iteratively/hierarchically processes sub-groups of drafters over time during a drafting project to identify and reconcile differences in terminology usage among different distributed drafters. The process 400 weights key values among the different drafters, and propagates new mapped values hierarchically upward within a distributed drafting project. Drafting project files of the distributed drafters may be evaluated and keyword values reconciled in real time, and as often as appropriate for a given drafting project. By use of the technology described herein, distributed drafting projects may be made more efficient by reduction of distributed computational processing by computing devices of individual drafters that would otherwise be required to resolve differences in terminology usage. Network bandwidth usage may be reduced by distributed centralized remote processing of different context files, and other platform improvements may result by use of the technology described herein.

As described above in association with FIG. 1 through FIG. 4, the example systems and processes provide distributed key-value consistency. Many other variations and additional activities associated with distributed key-value consistency are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
generating, by a processor within a networked distributed drafting platform, a public key-value context file that comprises initial default key-value mappings between keywords in a first language and values in a second language for use in a distributed drafting project, the generating of the public key-value file including:
retrieving the keywords from initial drafting project files into a public keys list,
assigning a default value to each of the retrieved keywords within the public keys list, and
storing the public keys list along with the initial default key-value mappings to the public key-value context file;
electing refined project-level key-value mappings by considering differences between the initial default key-value mappings and
personal key-value mappings within a plurality of distributed personal key-value context files each maintained by different drafters of the distributed drafting project; and
updating, within the networked distributed drafting platform, the initial default key-value mappings of the public key-value context file with the elected refined project-level key-value mappings.

2. The computer-implemented method of claim 1, where electing the refined project-level key-value mappings by considering the differences between the initial default key-value mappings and the personal key-value mappings within the plurality of distributed personal key-value context files each maintained by the different drafters of the distributed drafting project comprises:
merging similar personal key-value mappings of the keywords in the plurality of distributed personal key-value context files into aggregated new key-value mappings for the keywords; and
merging the aggregated new key-value mappings hierarchically upward from the distributed personal key-value context files within the distributed drafting project into the refined project-level key-value mappings.

3. The computer-implemented method of claim 1, where electing the refined project-level key-value mappings by considering the differences between the initial default key-value mappings and the personal key-value mappings within the plurality of distributed personal key-value context files each maintained by the different drafters of the distributed drafting project comprises:
defining a plurality of sub-groups of the different drafters of the distributed drafting project;
processing key-value mapping differences of sub-sets of the plurality of distributed personal key-value context files utilized by the different drafters of the distributed drafting project that are within each sub-group into sub-group level key-value mappings for the respective sub-group; and
aggregating results of the sub-group level key-value mappings of the plurality of sub-groups into the refined project-level key-value mappings.

4. The computer-implemented method of claim 3, where the defined plurality of sub-groups are defined according to a criterion selected from a group consisting of (i) geographic regions of the different drafters of the distributed drafting project and (ii) portions of the distributed drafting project worked on by the different drafters of the distributed drafting project.

5. The computer-implemented method of claim 1, further comprising automatically updating the public-key value context file in response to identifying a change in a personal key-value mapping within one of the plurality of distributed personal key-value context files.

6. A system, comprising:
a communication module; and
a processor within a networked distributed drafting platform programmed to:
generate a public key-value context file that comprises initial default key-value mappings between keywords in a first language and values in a second language for use in a distributed drafting project, the generating of the public key-value context file including:
  retrieving the keywords from initial drafting project files into a public keys list,
  assigning a default value to each of the retrieved keywords within the public keys list, and
  storing the public keys list along with the initial default key-value mappings to the public key-value context file;
elect refined project-level key-value mappings by considering differences between the initial default key-value mappings and
personal key-value mappings within a plurality of distributed personal key-value context files each maintained by different drafters of the distributed drafting project; and
update, using the communication module within the networked distributed drafting platform, the initial default key-value mappings of the public key-value context file with the elected refined project-level key-value mappings.

7. The system of claim 6, where, in being programmed to generate the public key-value context file that comprises the initial default key-value mappings between the keywords and the values for use in the distributed drafting project, the processor within the networked distributed drafting platform is programmed to:
  retrieve the keywords from initial drafting project files into a public keys list;
assign a default value to each of the retrieved keywords within the public keys list; and
  store the public keys list along with the initial default key-value mappings to the public key-value context file.

8. The system of claim 6, where, in being programmed to elect the refined project-level key-value mappings by considering the differences between the initial default key-value mappings and the personal key-value mappings within the plurality of distributed personal key-value context files each maintained by the different drafters of the distributed drafting project, the processor within the networked distributed drafting platform is programmed to:
  merge similar personal key-value mappings of the keywords in the plurality of distributed personal key-value context files into aggregated new key-value mappings for the keywords; and
  merge the aggregated new key-value mappings hierarchically upward from the distributed personal key-value context files within the distributed drafting project into the refined project-level key-value mappings.

9. The system of claim 6, where, in being programmed to elect the refined project-level key-value mappings by considering the differences between the initial default key-value mappings and the personal key-value mappings within the plurality of distributed personal key-value context files each maintained by the different drafters of the distributed drafting project, the processor within the networked distributed drafting platform is programmed to:
  define a plurality of sub-groups of the different drafters of the distributed drafting project;
  process key-value mapping differences of sub-sets of the plurality of distributed personal key-value context files utilized by the different drafters of the distributed drafting project that are within each sub-group into sub-group level key-value mappings for the respective sub-group; and
  aggregate results of the sub-group level key-value mappings of the plurality of sub-groups into the refined project-level key-value mappings.

10. The system of claim 9, where the defined plurality of sub-groups are defined according to a criterion selected from a group consisting of (i) geographic regions of the different drafters of the distributed drafting project and (ii) portions of the distributed drafting project worked on by the different drafters of the distributed drafting project.

11. The system of claim 6, where the processor within the networked distributed drafting platform is further programmed to automatically update the public-key value context file in response to identifying a change in a personal key-value mapping within one of the plurality of distributed personal key-value context files.

12. A computer program product, comprising:
  a computer readable storage medium having computer readable program code embodied therewith, where the computer readable program code when executed on a computer within a networked distributed drafting platform causes the computer to:
  generate a public key-value context file that comprises initial default key-value mappings between keywords in a first language and values in a second language for use in a distributed drafting project, the generating of the public key-value context file including:
    retrieving the keywords from initial drafting project files into a public keys list,
    assigning a default value to each of the retrieved keywords within the public keys list, and
    storing the public keys list along with the initial default key-value mappings to the public key-value context file;
  elect refined project-level key-value mappings by considering differences between the initial default key-value mappings and personal key-value mappings within a plurality of distributed personal key-value context files each maintained by different drafters of the distributed drafting project; and
  update, within the networked distributed drafting platform, the initial default key-value mappings of the public key-value context file with the elected refined project-level key-value mappings.

13. The computer program product of claim 12, where, in causing the computer within the networked distributed drafting platform to elect the refined project-level key-value mappings by considering the differences between the initial default key-value mappings and the personal key-value mappings within the plurality of distributed personal key-value context files each maintained by the different drafters of the distributed drafting project, the computer readable program code when executed on the computer within the networked distributed drafting platform causes the computer to:
  merge similar personal key-value mappings of the keywords in the plurality of distributed personal key-value context files into aggregated new key-value mappings for the keywords; and
  merge the aggregated new key-value mappings hierarchically upward from the distributed personal key-value context files within the distributed drafting project into the refined project-level key-value mappings.

14. The computer program product of claim 12, where, in causing the computer within the networked distributed drafting platform to elect the refined project-level key-value mappings by considering the differences between the initial default key-value mappings and the personal key-value mappings within the plurality of distributed personal key-value context files each maintained by the different drafters of the distributed drafting project, the computer readable program code when executed on the computer within the networked distributed drafting platform causes the computer to:
- define a plurality of sub-groups of the different drafters of the distributed drafting project;
- process key-value mapping differences of sub-sets of the plurality of distributed personal key-value context files utilized by the different drafters of the distributed drafting project that are within each sub-group into sub-group level key-value mappings for the respective sub-group; and
- aggregate results of the sub-group level key-value mappings of the plurality of sub-groups into the refined project-level key-value mappings.

15. The computer program product of claim 14, where the defined plurality of sub-groups are defined according to a criterion selected from a group consisting of (i) geographic regions of the different drafters of the distributed drafting project and (ii) portions of the distributed drafting project worked on by the different drafters of the distributed drafting project.

16. The computer program product of claim 12, where the computer readable program code when executed on the computer within the networked distributed drafting platform further causes the computer to automatically update the public-key value context file in response to identifying a change in a personal key-value mapping within one of the plurality of distributed personal key-value context files.

* * * * *